United States Patent Office 3,551,430
Patented Dec. 29, 1970

3,551,430
ESTERS OF HEXAHYDRO - 9,10 - DIALKOXY - 2H-BENZO[a]QUINOLIZINE-1-PROPIONIC ACID
Holger V. Hansen, Denville, and Robert I. Meltzer, Rockaway, N.J., assignors to Warner-Lambert Pharmaceutical Company, Morris Plains, N.J., a corporation of Delaware
No Drawing. Continuation-in-part of application Ser. No. 559,118, June 21, 1966. This application Aug. 8, 1969, Ser. No. 848,680
Int. Cl. C07d 39/12
U.S. Cl. 260—287                2 Claims

ABSTRACT OF THE DISCLOSURE

A class of quinolizine derivatives of the formula:

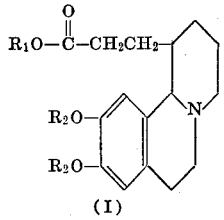

(I)

in which $R_1$ and $R_2$ are lower alkyl.
These compounds are useful in cardiac failure.

---

This application for United States Letters Patent is a continuation-in-part application of our copending application U.S. Ser. No. 559,118, filed June 21, 1966, now abandoned.

This invention relates to esters of hexahydro-9,10-dialkoxy-2H-benzo[a]quinolizine - 1 - propionic acid of the formula:

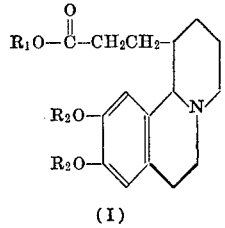

(I)

wherein $R_1$ and $R_2$ may be lower alkyl of 1 to 6 carbon atoms such as methyl, ethyl, propyl, isopropyl, butyl, isobutyl and the like.

This invention also includes within its scope the nontoxic pharmaceutically acceptable acid addition salts of the above compounds as well as the various pharmaceutical dosage forms containing the subject compounds or their acid addition salts as active ingredients.

The compounds of this invention exhibit inotropic activity in mammalian hosts, such as cats, dogs, monkeys, and the like. For example, they stimulate the contractile force of coronary muscles in dogs when administered intravenously at a dose level of 0.5 to 2.0 mg./kg. Broadly speaking, these compounds can be used in a similar fashion as quindonium bromide and are useful in cases of cardiac arrest.

In order to use these compounds they are combined with a pharmaceutical carrier such as lactose or dicalcium phosphate to form dosage forms such as tablets or solubilized in water to form a solution for injection.

The dosage useful in treating cardiac failure is from about 0.1 mg. to 100 mg. administered orally or parenterally several times daily. The dosage regimen may be adjusted in accordance with individual requirements.

According to the process of this invention, the above compounds are prepared by treating 1,2,3,4,6,7 - hexahydro - 9,10 - dialkoxybenzo[a]quinolizinium salt of the formula:

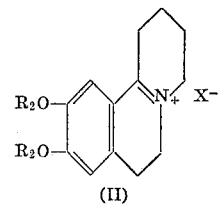

(II)

wherein $R_2$ has the same meaning as previously defined and X is an anion such as chloride, bromide, fluoride, iodide, sulfate, perchlorate and the like with an excess of an aqueous alkali at a temperature of about 0° to 25° C. This treatment results in the formation of the corresponding enamine of the formula:

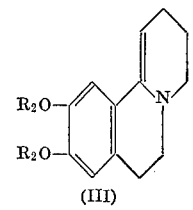

(III)

Compound III is then extracted into a nonpolar water-immiscible solvent such as xylene, toluene and the like and treated with an acrylic acid ester of the formula:

$$CH_2=CHCO_2R_1$$

(IV)

wherein $R_1$ is as defined, in the presence of an alcohol preferably an aliphatic alcohol such as absolute ethanol at reflux temperature of the alcohol employed for about 1 to 12 hours. Following this treatment the mixture is acidified to yield a quinolizinium salt of the formula:

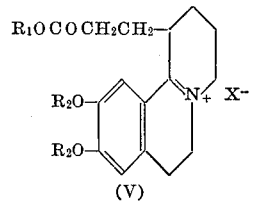

(V)

wherein $R_1$, $R_2$ and X have the same meaning as defined.

Compound V is then reduced without further purification catalytically with gaseous hydrogen or preferably with a complex metal hydride such as sodium or potassium borohydride in aqueous alcohol to give compounds of this invention corresponding to structure I.

The preparation of the starting material II is described by Child and Pyman (J. Chem. Soc., 1931, 36). Conversion to the enamine form (III) has been discussed by Y. Ban and O. Yonemitsu (Chem. Pharm. Bull., 8, 653 (1960)). The addition of acrylate esters to simple enamines has been described by G. Stork et al. (J. Amer. Chem. Soc., 85, 207 (1963)).

The salts of the present invention are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric, and the like acids, and organic acids, such as, for example, benzoic, acetic, salicylic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

The following example is included in order further to illustrate the invention. All temperatures are given in degrees centigrade.

EXAMPLE

Ethyl 1,3,4,6,7,11b-hexahydro-9,10-dimethoxy-2H-benzo[a]quinolizine-1-propionate hydrobromide An aqueous solution of 20 g. (0.06 mol) of 1,2,3,4,6,7-hexahydrobenzo[a]quinolizinium bromide is treated with excess aqueous potassium hydroxide and the resulting free base is extracted into 500 ml. of toluene. To the dried (potassium carbonate) toluene solution is added a solution of 18.5 g. (0.185 mol) of ethyl acrylate in 100 ml. of absolute ethanol. The resulting solution is refluxed for two hours, cooled and treated with a slight excess of hydrogen bromide to form the intermediate quaternary salt. The mixture is then evaporated and the crude hygroscopic residue is dissolved in 200 ml. of water and 200 ml. of ethanol. This solution is then stirred and cooled in ice while 5 g. of potassium borohydride is added in small portions. The mixture is stirred at about 20° to 30° C. for ½ hour, then partially evaporated to remove ethanol. The resulting oil is extracted into 500 ml. of ether and, after drying (magnesium sulfate) and charcoal treatment, the ether solution is treated with an excess of hydrogen bromide to precipitate the salt as an oil. Two recrystallizations yield pure ethyl 1,3,4,6,7,11b-hexahydro-9,10-dimethoxy - 2H-benzo[a]quinolizine-1-propionate hydrobromide, M.P. 159.5°–161.5°

$\lambda_{max.}^{EtOH}$ 232 mμ (ε) (7900), 281 sh. (3620), 285 (3630) and 289 sh. (3280); $\nu^{Nujol}$ 2650, 2550 (NH+), 1735 (CO) cm.$^{-1}$.

*Analysis.*—Calc'd for $C_{20}H_{29}NO_4 \cdot HBr$ (percent): C, 56.08; H, 7.06; N, 3.27; Br, 18.65. Found (percent): C, 55.93; H, 7.07; N, 3.10; Br, 18.51, 18.54.

A sample of the free base is obtained from a similar reaction, omitting the final hydrogen bromide treatment and has M.P. 76°–77° after recrystallization from petroleum ether.

$\lambda_{max.}^{EtOH}$ 222 mμ (ε) sh. (9600), 282 (3800), 286 (3800) and 290 sh. (3300); $\nu^{Nujol}$ 2700, 2750 (Bohlmann bands), 1720 (CO) cm.$^{-1}$.

We claim:
1. A compound of the formula:

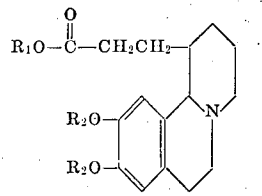

wherein $R_1$ and $R_2$ are lower alkyl.

2. Ethyl 1,3,4,6,7,11b - hexahydro - 9,10-dimethoxy-2H-benzo[a]quinolizine-1-propionate and its non-toxic acid addition salts.

References Cited

UNITED STATES PATENTS 3,452,025    6/1969    Hansen et al. _____ 260—286X

OTHER REFERENCES

Szantay et al.: Chem. Abst., vol. 68, col. 68901d (1968) abstracting Hungary Pat. 153,695, May 1967.

Osborne et al.: Jour. Pharm. and Expt'l. Therap., vol. 147, 225–31 (1965).

Casagrande et al.: Jour. Mer. Chem., vol. 11, pp. 765–9 (1968).

DONALD G. DAUS, Primary Examiner

U.S. Cl. X.R.

260—286, 999